Dec. 8, 1970   C. FRICONNEAU ET AL   3,546,087
STORAGE OF ELECTRODES FOR THE MEASUREMENT OF pH VALUES
Filed April 29, 1968

INVENTORS
CLAUDE FRICONNEAU
ALAIN LEBOUTET
BY
Craig & Antonelli
ATTORNEYS

United States Patent Office 3,546,087
Patented Dec. 8, 1970

3,546,087
STORAGE OF ELECTRODES FOR THE MEASUREMENT OF pH VALUES
Claude Friconneau, Manosque, and Alain Leboutet, Aix-en-Provence, France, assignors to Commissariat a l'Energie Atomique, Paris, France
Filed Apr. 29, 1968, Ser. No. 725,051
Claims priority, application France, May 8, 1967, 105,601
Int. Cl. G01n 27/30, 27/36
U.S. Cl. 204—195      6 Claims

ABSTRACT OF THE DISCLOSURE

The conditions of storage of glass electrodes for the measurement of pH values are improved by dipping the bulb (measuring electrode) or the junction (reference electrode) in a saturated salt solution contained in a small cup, then in sealing the contents of the cup with an elastic resin.

---

This invention relates to an improvement in the storage of electrodes for the measurement of pH values and facilitates the utilization of reference electrodes.

At the present time, the storage of electrodes is carried out in a more or less satisfactory manner. Leakages frequnetly occur at the junction as well as the opening provided for the addition of electrolyte, the packaging material being consequently soiled by the salt of the electrolyte. It sometimes happens also that the electrode empties, which can be fatal in the case of a calomel electrode and in any case gives rise to major disadvantages when putting the electrode into service (rehydration of the junction, etc.).

Glass electrodes are stored with the bulb in the dry state. The bulb must therefore by rehydrated prior to use, thereby entailing a waiting period of 24 to 48 hours during which the electrode cannot be used.

The present invention makes it possible to overcome the above-mentioned disadvantages.

The improvement in the storage of electrodes for measuring pH values in accordance with the invention consists in dipping the bulb (measuring electrode) or the junction (reference electrode) in a saturated salt solution contained in a small cup made of plastic material, for example, then in sealing the contents of the cup with an elastic resin.

The adhesion of the resin to the body of the electrode must be sufficient to ensure leak-tightness while making it possible to withdraw the electrode from the layer of resin with an effort which is compatible with the strength of the electrode body.

In the case of the reference electrode, when provision is made for junctions which have preferably a low diffusion (for example a palladium junction of the Beckman type, a platinum junction of the Meci type, glass rivets of the Leeds-Northrup type, etc.) and which make use of an internal electrolyte which is preferably of the salt-saturated solution type, it is an advantage to seal the surface of the electrolyte internally with an elastic resin. The resin employed must be of lower density than the electrolyte and must polymerize at the surface of the electrolyte.

A better understanding of the invention will be gained by consideration of one exemplified embodiment which will now be described in reference to the accompanying drawings.

Figure 1:
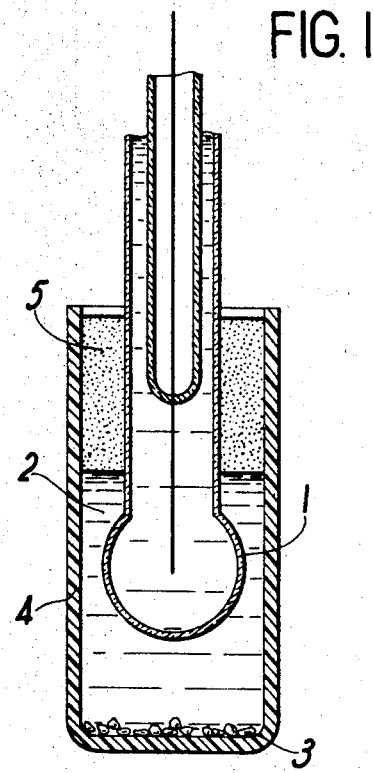
Figure 2:
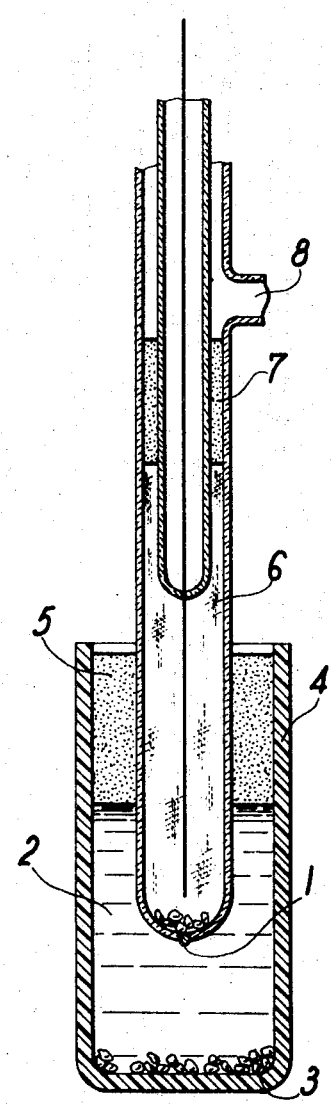

The bulb 1 of the measuring electrode (as illustrated in FIG. 1) or the junction 1 of the reference electrode (shown in FIG. 2) is immersed in a solution 2 which is saturated with potassium chloride crystals 3 contained in a plastic cup 4. A free space of approximately one centimeter is reserved between the surface of the saturated solution and the top rim of the cup. Said cup is then filled with the elastic resin. The resin employed is marketed by the Societe Industrielle des Silicones under the trade name of SI 182.

This resin has a lower density than water, with the result that it remains and polymerizes at the surface. After polymerization, the plastic cup is sealed by a resin plug 5 having a thickness of one centimeter. When required for use, the electrode need merely be withdrawn from the resin plug by pulling. The resin is sufficiently flexible not to damage the bulb of the measuring electrode when this latter is put into service.

In order to close off the communication between the interior and the exterior of the reference electrode, there is placed above the internal electrode 6 a resin plug 7. Prior to polymerization, the resin is accordingly introduced by means of a syringe through the opening 8 for the addition of electrolyte which is provided in all commercially available electrodes. The resin which is less dense than the internal electrolyte therefore polymerizes at the surface of the electrolyte.

This closure operation has been carried out experimentally with silver chloride reference electrodes having a junction of the glass rivet type. The electrolyte being saturated with potassium chloride, an excess quantity of 300 mg. of potassium chloride in crystals was added prior to sealing the internal electrolyte. This electrode was immersed over a period of four months in water containing less than 100 $\mu$/l. of chloride and continuously renewed at a rate of 50 l./hr. Upon completion of the experiment approximately 200 mg. of potassium chloride in crystal form remained inside the electrode. It may therefore be concluded that an electrode of this type can safely be employed for a period of one year. During that year of operation, the electrode will always remain in a perfect state. By sealing the electrolyte with a layer of elastic resin, any danger of loss of electrolyte through the junction, through the addition hole, or simply by evaporation is thereby eliminated.

The method of conditioning in accordance with the present invention makes it possible to store electrodes which are ready for use. This dispenses with the need for the waiting period of 24 to 48 hours which had hitherto proved necessary for rehydration of the bulb prior to putting the measuring electrode into service.

By virtue of the method proposed, it is possible to avoid any leakage of electrolyte during storage which would otherwise result in soiling of the packaging material and also make the electrode unserviceable.

The layer of resin placed above the internal electrolyte eliminates all need of maintenance by addition of electrolyte and removes any danger of emptying by overturning. The electrode is preserved in perfect condition and can be employed over a period of more than one year without giving rise to any problem.

What we claim is:

1. An arrangement of elements for improving the storage of a glass or a reference electrode used to measure pH values comprising a container containing a saturated salt solution, a glass electrode or a reference electrode disposed in the saturated salt solution and an elastic resin disposed next to the saturated salt solution to seal the contents of said container.

2. The arrangement of claim 1, wherein the reference electrode is further provided with an internal electrolyte which is sealed with an elastic resin.

3. The arrangement of claim 1, wherein the resin has a lower density than the electrolyte.

4. The arrangement of claim 1, wherein the resin polymerizes at the surface of the electrolyte.

5. The arrangement of claim 1, wherein the resin is a silicone resin.

6. The arrangement of claim 1, wherein the saturated salt solution is potassium chloride.

References Cited

UNITED STATES PATENTS

| | | | |
|---|---|---|---|
| 1,439,956 | 12/1922 | Fuld | 136—133 |
| 3,114,085 | 12/1963 | Ruscetta et al. | 136—133 |
| 3,140,247 | 7/1964 | Fournie-Taillant-Vermoulet | 204—195.1 |
| 3,223,558 | 12/1965 | Purcell | 136—170 |
| 3,282,457 | 11/1966 | Sirois | 215—47 |
| 3,227,643 | 1/1966 | Okun et al. | 204—195 |

OTHER REFERENCES

Wes et al., "Reference Electrodes," 1961, pp. 266 and 267.

TA-HSUNG TUNG, Primary Examiner

U.S. Cl. X.R.

215—47